US005088287A

United States Patent [19]

Shekleton

[11] Patent Number: 5,088,287

[45] Date of Patent: Feb. 18, 1992

[54] COMBUSTOR FOR A TURBINE

[75] Inventor: Jack R. Shekleton, San Diego, Calif.

[73] Assignee: Sundstrand Corporation, Rockford, Ill.

[21] Appl. No.: 379,494

[22] Filed: Jul. 13, 1989

[51] Int. Cl.[5] ................ F02C 1/00

[52] U.S. Cl. ................ 60/740; 60/39.827

[58] Field of Search ................ 60/39.827, 39.826, 748, 60/742, 740; 123/179 L; 431/264

[56] References Cited

U.S. PATENT DOCUMENTS

| | | | |
|---|---|---|---|
| 1,828,784 | 10/1931 | Perrin | 60/39.36 |
| 2,574,495 | 11/1951 | Parker, Jr. | 60/39.827 |
| 2,977,760 | 4/1961 | Soltau et al. . | |
| 3,055,179 | 9/1962 | Lefebvre et al. . | |
| 3,306,333 | 2/1967 | Mock | 431/264 |
| 3,668,869 | 6/1972 | De Corso et al. | 60/39.74 R |
| 3,800,530 | 4/1974 | Nash | 60/39.827 |
| 3,954,389 | 5/1976 | Szetela | 60/39.826 |
| 4,081,957 | 4/1978 | Cox, Jr. . | |
| 4,204,404 | 5/1980 | Fehler et al. | 60/740 |
| 4,215,979 | 8/1980 | Morishita | 60/39.827 |
| 4,257,235 | 3/1981 | Morishita et al. . | |
| 4,260,367 | 4/1981 | Markowski et al. | 60/748 |
| 4,262,482 | 4/1981 | Roffe et al. . | |
| 4,354,345 | 10/1982 | Dreisbach, Jr. et al. . | |
| 4,365,477 | 12/1982 | Pearce . | |
| 4,429,527 | 2/1984 | Teets . | |

FOREIGN PATENT DOCUMENTS

| | | | |
|---|---|---|---|
| 1018963 | 2/1966 | United Kingdom | 60/39.827 |
| 2032519 | 5/1980 | United Kingdom | 60/39.827 |

*Primary Examiner*—Richard A. Bertsch
*Assistant Examiner*—Timothy S. Thorpe
*Attorney, Agent, or Firm*—Wood, Phillips, Mason, Recktenwald & VanSanten

[57] ABSTRACT

Unreliable ignition in a small volume combustor for a gas turbine may be avoided in a combustor construction including a generally spherical combustion chamber (10). The chamber (10) includes an outlet 14 diametrically opposite from an inlet (12) and a first injector (24) is disposed in the inlet (12) and includes an annular oxidant port provided with swirler vanes (36) and a fuel injecting head (46) provided with a ring-like series of fuel injection orifices (54) directed to inject fuel in a path (30) that is cone-like. A second injector (26) is included for injecting fuel into the chamber at or near the outlet (14) and an igniter (32) is disposed in the chamber (10) at the inlet (12). A small tube (38) is utilized to direct a small quantity of fuel at the igniter (32).

9 Claims, 2 Drawing Sheets

COMBUSTOR FOR A TURBINE

FIELD OF THE INVENTION

This invention relates to an auxiliary combustor that may be used in connection with airborne turbines.

BACKGROUND OF THE INVENTION

The assignee of the instant application has proposed so-called auxiliary power units (APU's) or emergency power units (EPU's) that are driven by air breathing turbines and which are intended to be utilized in aircraft such as so-called "fly by wire" aircraft. One requirement of many such systems is that the same be able to be brought up to operational speed in a very short period of time, frequently as little as 2-3 seconds, over a wide range of altitudes. This requirement is particularly difficult to achieve at high altitudes because of insufficient naturally occurring oxidant at those altitudes. Thus, the assignee has proposed what have been referred to as stored energy systems for use in connection with such APU's or EPU's, and which typically include an auxiliary combustor, that is, a combustor in addition to the usual combustor or combustors employed in the gas turbine itself. The auxiliary combustor is provided with oxidant such as oxygen, oxygen-enriched air, or air from a storage vessel, typically a pressure bottle.

At high altitudes, relatively cold conditions are present and it is not unusual for the mass of the system including the oxidant, fuel to be utilized as well as the metal components of the system to be at temperatures on the order of −40 degrees Fahrenheit. When the oxidant is flowed to the combustor, the Joule-Thompson effect instantaneously lowers the oxidant temperature to a very low level. Temperatures as low as −110 degrees F. have been observed.

Typical fuels have a freezing point of about −50 degrees Fahrenheit with a consequence that the injection of well atomized fuel into the cold oxidant can result in freezing of the fuel before the fuel ignites.

Moreover, as the oxidant in the storage bottles becomes depleted during the operation of the system, an increasing drop in oxidant temperature occurs and has resulted in the oxidant being delivered at a temperature as low as −160 degrees F. In such a situation, even if ignition was initially obtained, the fuel might later freeze during operation and prevent proper operation of the system.

The problem becomes increasingly acute as combustor size is reduced and those familiar with the requirements of airborne systems will readily appreciate that a constant effort is made to minimize size of aircraft components in terms of minimizing both weight and volume.

In the case of an auxiliary combustor for systems of the type of concern, conventional wisdom has dictated that the ignitor or ignitors be located at the radially outer extremity of the combustor chamber. Such a location, it is felt, assures good ignition because of the longer distance the fuel and oxidant must travel from the typical injector location at the chamber inlet before encountering the igniter at the lowest possible velocity. With a small volume combustor, as volume is decreased, the flame recirculation zone becomes progressively smaller. This zone is required to assure continued ignition of incoming fuel and if the same becomes too small, the initial kernel of flame from the igniter may be swept out of the combustor itself without contacting and igniting the recirculating flow. Conventionally locating the igniter accentuates this possibility.

The present invention is directed to overcoming one or more of the above problems.

SUMMARY OF THE INVENTION

It is the principal object of the invention to provide a new and improved combustor for use with a turbine. More specifically, it is an object of the invention to provide a small volume combustor that has a high degree of reliability both in starting and in subsequent operation.

An exemplary embodiment of the invention achieves the foregoing object in a combustor including a chamber having a relatively narrow inlet, an opposite, relatively narrow outlet, and an enlarged intermediate combustion area. A fuel injector is located in the inlet for injecting fuel in a cone-like spray into the combustion area. An igniter is disposed in the chamber upstream of the outlet and out of the path of the cone-like spray. A tube of small diameter extends from the injector to the igniter for directing a small percentage of the fuel supplied to the injector at the igniter.

In a preferred embodiment, the tube is a capillary tube. Preferably, the igniter is disposed at the inlet.

The invention also contemplates that the inlet have an annular oxidant port about the fuel injector and be provided with swirler vanes. The tube extends radially outwardly from the fuel injector and circumferentially in the direction of swirl of oxidant emerging from the port. In a highly preferred embodiment of the invention, the chamber is generally spherical.

In a highly preferred embodiment of the invention, the fuel injector includes a fuel injecting head with a ring-like series of fuel injection orifices. Preferably, the tube is mounted on the fuel injection head in one of the orifices.

In a highly preferred embodiment, the tube has a cross-sectional area that is on the same order as that of one of the orifices.

Other objects and advantages will become apparent from the following specification taken in connection with the accompanying drawings.

DESCRIPTION OF THE PREFERRED EMBODIMENT

Figure 1:
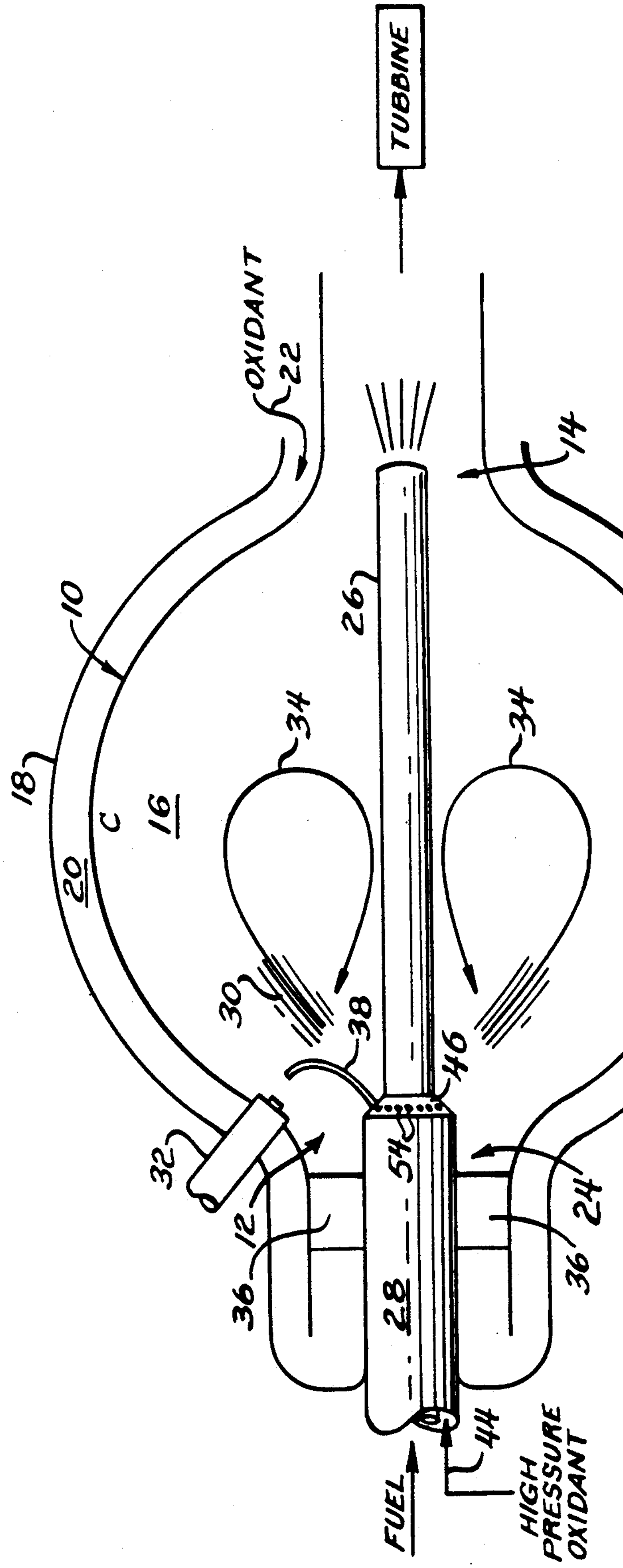
FIG. 1 is a somewhat schematic, sectional view of a combustor made according to the invention.

An exemplary embodiment of a combustor made according to the invention is illustrated in the drawings and with reference to FIG. 1 is seen to include a chamber, generally designated 10, having an inlet 12 and an opposed outlet 14. The chamber 10 is generally spherical in shape which is to say that the inlet 12 and outlet 14 are relatively narrow in comparison to the intermediate combustion area 16.

In a preferred embodiment of the invention, the chamber 10 is contained within a housing 18 so that a peripheral flow path 20 exists about the chamber 10. Oxidant is fed into the housing 18 in the direction of an arrow 22 from a source such as a pressure bottle and directed by the housing 18 to the inlet area 12. As a consequence, when combustion is occurring in the combustion area 16, the relatively cold oxidant will be warmed somewhat as it flows to the inlet area 12 by heat transfer through the wall of the chamber 10 and in the process cools the combustor wall.

Located within the inlet area 12 is an injector structure, generally designated 24. The injector structure includes a central fuel injecting tube 26 that extends through the combustion area 16 to the outlet 14 to inject fuel at or near the outlet 14. This fuel is not combusted, but is utilized to lower the temperature of the products of combustion resulting from combustion within the combustion area 16 to a temperature suitable for application to a turbine without unduly shortening its life.

Disposed about the tube 26 in concentric relation is a further tube 28 which is combined with other structure to be described in greater detail hereinafter to inject fuel in a cone-like spray 30 at the inlet 12. The spray of fuel 30 thus has both a radial component and an axial component as it moves into the increasingly larger diameter of the combustion area 16 adjacent the inlet 12.

A conventional spark igniter 32 is located at the inlet 12 as opposed to the more conventional location shown as point C in the drawing.

The recirculation zone of oxidant and fuel is shown by arrows 34. It should be noted that the fuel spray 30 is in immediate proximity to the recirculation zone 34 and is not premixed with the incoming air. This minimizes the possibility of fuel freeze. But as a consequence there is a paucity of fuel at the ignitor 32.

Extending outwardly from the tube 28 to the periphery of the inlet 12 are a plurality of swirler vanes 36. Oxidant flowing through the passage 20 is redirected by the swirler vanes 36 as it enters the combustion area 16. In a highly preferred embodiment, the swirler vanes 36 are angled with respect to the axis of the fuel injector, as well as the chamber 10, by about 35 degrees instead of the more usual 45 degrees. In general terms, the system is to direct a relatively small quantity of fuel at the igniter 32.

Figure 2:
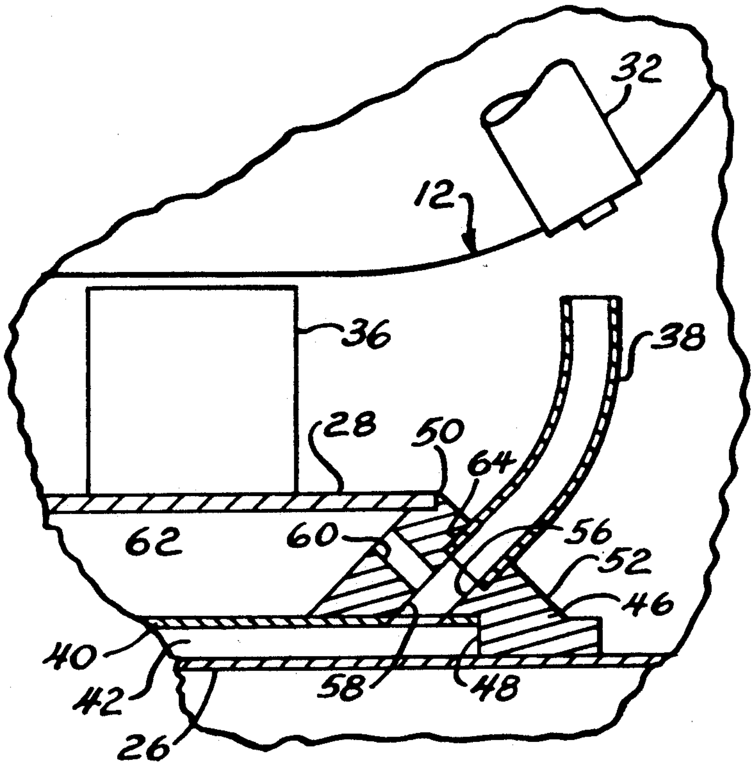
FIG. 2 is an enlarged, fragmentary sectional view of a fuel injector employed in the invention.
Figure 3:
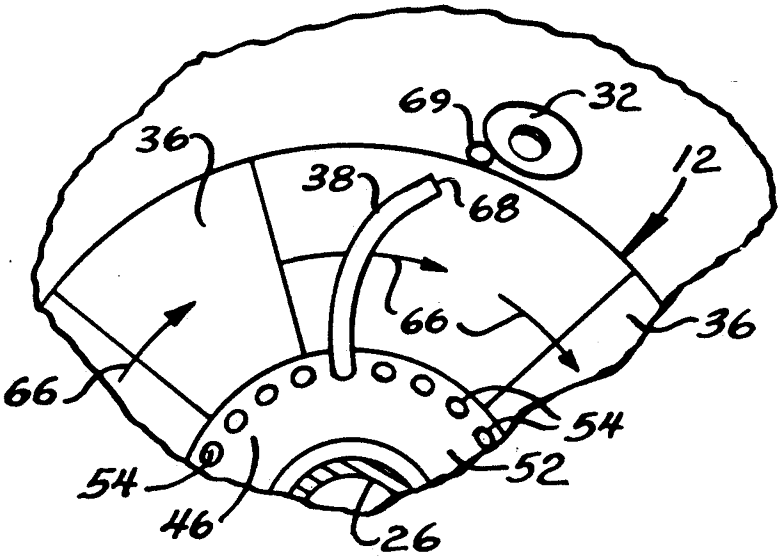
FIG. 3 is an enlarged, fragmentary, elevation of the fuel injector.

Turning now to FIG. 2 and 3, greater detail of the injector structure 24 can be seen. Intermediate the tubes 28 and 26 is a further tube 40. The tube 40 together with the tube 26 define an annular fuel receiving space 42. The space between the tube 40 and the tube 28 is a pressurized oxidant receiving space which is at a significantly higher pressure than the oxidant flowing through passage 20, to the combustor. This pressurized oxidant 44 is typically supplied, through appropriate controlling means, from the oxidant storage bottles and represents a very small percentage of the total oxidant flow.

A fuel injecting head 46 is mounted on the tube 26 and is abutted against respective ends 48 and 50 of the tubes 40 and 28.

The injector head 46 includes a 45 degree conical face 52 and in a preferred embodiment has an outer diameter of approximately 1 inch, although these values are not critical. Within the face 52 are a plurality of fuel injection orifices 54 arranged in a ring-like pattern and arranged at an angle of 45 degrees as shown and which results in a fuel spray angle of 45 degrees. Of course there could be significant variations in this angle depending on combustor geometry, provided that the fuel spray 30 lies in immediate proximity to the recirculation zone 34 and is not premixed with the incoming, swirling, oxidant. The position of the recirculation zone 34 is readily established by aerodynamic measurements well known to those familiar with the art. In one embodiment of the invention, 36 orifices 54 are employed and each orifice 54 has a diameter of 0.018 inches. As seen in FIG. 2, the orifices 54 include inwardly directed passages 56 which are in fluid communication with the interior of the space 42 by means of apertures 58 located in the tube 40 near the end 48 thereof.

At right angles to the passages 56, the head 46 includes communicating passages 60 which intersect the passages 56 and which open to the space 62 between the tubes 28 and 40. This space, it will be recalled, is connected via appropriate control means to the pressurized oxidant 44. As a result, atomization of fuel occurs with an oxidant assist with very little premixing because of the proximity of the passages 60 to the orifices 54 and the small amount of oxidant used. This minimal premixing minimizes the time during which the fuel is exposed to the relatively cold oxidant and thus reduces the possibility of freezing.

As seen in FIG. 2, one of the passages 56 is slightly enlarged at its point of emergence to receive an end 64 of the tube 38 to thereby mount the tube 38 to the head 46. The tube 38 extends radially outwardly toward the igniter 32. Referring to FIG. 3, the direction of swirl of the incoming oxidant is indicated by arrows, and it can be seen that the end 68 of the tube 38 opposite the end 64 is directed in the direction of swirl, as well as toward the igniter 32. Preferably, the outlet end 68 of the tube 38 is directed toward a location 69 just upstream of the igniter 32 in the direction of swirl and just radially inward of the igniter 32. The swirl of the incoming oxidant carries the fuel across the igniter in the circumferential direction while the pressure of injection and the centrifugal force applied to the fuel by the swirling oxidant carry the fuel radially outward to the igniter.

As alluded to previously, the tube 38 is preferably a capillary tube and has an inner diameter of about the same diameter as the orifices 54. Where more than one of the igniters 32 is employed, there will be a commensurate increase in the number of the tubes 38. The presence of the tube 38 assures that an atomized spray is directed at the igniter 32. This results in the presence of an ignitable fuel-oxidant mixture at the igniter, as well as an ignitable fuel-oxidant mixture in the trajectory or path taken by the flame from the spark of the igniter 32. This results in the meeting of two of the three requirements for continued operation of the combustor. The third, the presence of an ignitable fuel-oxidant mixture in the recirculation zone, is met by the fact that there are a large number of the orifices 54 injecting a highly atomized spray in immediate proximity to the recirculation zone 34. The use of the tube 38 does not detract from this spray to any great degree since in the configuration illustrated, only about 2½ percent or less of the total fuel flow emanates from the tube 38.

It is also to be observed that the flame front, that is, the interface of flame between the incoming fuel and oxidant, and the recirculating gas in the recirculating zone 34 will be downstream from the tube 38. This fact, coupled with the fact that the tube 38 is well cooled by fuel flowing through it, assures long life and reliable ignition.

Thus, the invention provides a new and improved auxiliary combustor for stored energy systems that starts and operates reliabily and which may be of the desirably small volume necessary for airborne applications.

I claim:

1. A small volume combustor for a gas turbine or the like comprising:

a generally spherical combustion chamber;

an inlet to said chamber;

an outlet from said chamber generally diametrically opposite from said inlet;

means for injecting fuel into said chamber including a first injector in said inlet including an annular oxidant port provided with swirler vanes and a fuel injecting head including a ring-like series of fuel injection orifices within said port and directed to inject fuel into said chamber in paths having both axial and radial components, and a second injector for injecting fuel into said chamber at or near said outlet;

an igniter in said chamber at said inlet end; and a small tube connected to said fuel injecting means within said chamber for directing a small quantity of fuel at said igniter, said tube being mounted on said head in one of said orifices.

2. A small volume combustor for a gas turbine or the like comprising:

a generally spherical combustion chamber;

an inlet to said chamber;

an outlet from said chamber generally diametrically opposite from said inlet;

means for injecting fuel into said chamber including a first injector in said inlet including an annular oxidant port provided with swirler vanes and a fuel injecting head including a ring-like series of fuel injection orifices within said port and directed to inject fuel into said chamber in paths having both axial and radial components, and a second injector for injecting fuel into said chamber at or near said outlet;

an igniter in said chamber at said inlet end; and a small tube connected to said fuel injecting means within said chamber for directing a small quantity of fuel at said igniter, said tube being mounted on said head in one of said orifices.

3. The combustor of claim 2 wherein said tube has a cross-sectional area on the same order as that of one of said orifices.

4. A small volume combustor for a gas turbine comprising:

a chamber having a relatively narrow inlet, an opposite relatively narrow outlet and an enlarged intermediate combustion area;

a fuel injector in said inlet for injecting fuel in a cone-like spray into said combustion area;

an igniter in said chamber upstream of said outlet and out of the path of said cone-like spray; and a tube of small diameter entirely within the chamber extending from said fuel injector to said igniter for directing a small percentage of the fuel supplied to the injector at said igniter.

5. The combustor of claim 4 wherein said tube is a capillary tube.

6. The combustor of claim 4 wherein said igniter is at said inlet and said tube is a capillary tube.

7. The combustor of claim 6 wherein said inlet includes an annular oxidant port about said fuel injector and swirler vanes in said port, said tube extending radially outwardly from said fuel injector and circumferentially in the direction of swirl of oxidant emerging from said port.

8. The combustor of claim 7 wherein said chamber is generally spherical.

9. The combustor of claim 4 wherein said fuel injector includes at least one orifice in said chamber for injecting fuel in a cone-like spray into said combustion area and said tube is wholly within said chamber, and is mounted in and extends from said orifice toward said igniter.

* * * * *